United States Patent Office.

GAMALIEL KING, OF WESTFIELD, MASSACHUSETTS, ASSIGNOR TO HIMSELF AND CHARLES C. PRATT, OF SAME PLACE.

Letters Patent No. 65,917, dated June 18, 1867.

IMPROVED METHOD OF COVERING WHIPS.

*The Schedule referred to in these Letters Patent and making part of the same.*

TO ALL WHOM IT MAY CONCERN:

Be it known that I, GAMALIEL KING, of Westfield, Hampden county, Commonwealth of Massachusetts, have invented a new and useful Improved Method of Covering Whips; and I do hereby declare that the following is a full and exact description thereof.

This invention consists in covering the stock of the whip beneath the outer covering with a preparation which renders it water-proof and more flexible and solid.

The preparation used for this purpose by me is composed in the following manner and of the ingredients which I will now explain: I dissolve caoutchouc in proportion of about two pounds to one gallon of benzine, spirits of turpentine, or naphtha, fluids having equivalent and similar properties. When the rubber is dissolved in this, I add about two-thirds of a pound of red or white lead, which is thoroughly mixed with the solution of rubber, and in some cases add a small proportion of linseed oil. When this preparation is so prepared, I coat the stock of the whip its entire length with it, applying it with a brush or by dipping the stock in long tubes containing the solution. While the substance forming the coating is still slightly glutinous I braid the foundation thus formed over with the first braiding, after which another coating of the same preparation is applied in a similar manner as the first, when the whip is again braided over with an outside braiding, completing the process. It is not necessary that both braidings and viscous coatings should be put on in this manner as in some cases, where a less expensive whip is manufactured, I braid the stock over with a first braiding and then apply the chemical coating forming the final braiding over this, leaving only one coating of the preparation between the two braidings. Again, I sometimes apply the coat of water-proof to the stock foundation, braiding over it an outside covering, thus forming a still cheaper class of whip. The lead used in this combination is for the purpose of giving consistency and hardness to the same, although it is not absolutely essential to the success of my improvement.

In this manner I obtain a much more flexible and tough whip than can be obtained otherwise, the substance used thoroughly filling up the interstices of the braiding and forming a solid stock, while at the same time it is rendered impervious to water and dampness.

And now, having described my invention, what I claim as new, and desire to secure by Letters Patent, is—

1. A water-proof coating, consisting of the combined ingredients herein shown and described.

2. The application of the dissolved caoutchouc, with or without the lead and oil, to a whip, substantially as and for the purpose shown.

GAMALIEL KING.

Witnesses:
EDWARD H. HYDE,
R. F. HYDE.